United States Patent
Kuehne

(10) Patent No.: US 11,364,803 B2
(45) Date of Patent: Jun. 21, 2022

(54) METHOD FOR OPERATING A DISPLAY DEVICE WORN ON THE HEAD BY A VEHICLE OCCUPANT OF A MOTOR VEHICLE, AND DISPLAY SYSTEM FOR A MOTOR VEHICLE

(71) Applicant: AUDI AG, Ingolstadt (DE)

(72) Inventor: Marcus Kuehne, Beilngries (DE)

(73) Assignee: AUDI AG, Ingolstadt (DE)

( * ) Notice: Subject to any disclaimer, the term of this patent is extended or adjusted under 35 U.S.C. 154(b) by 5 days.

(21) Appl. No.: 17/258,911

(22) PCT Filed: Sep. 7, 2018

(86) PCT No.: PCT/EP2018/074166
§ 371 (c)(1),
(2) Date: Jan. 8, 2021

(87) PCT Pub. No.: WO2020/011383
PCT Pub. Date: Jan. 16, 2020

(65) Prior Publication Data
US 2021/0291657 A1    Sep. 23, 2021

(30) Foreign Application Priority Data
Jul. 9, 2018  (DE) .................... 10 2018 211 261.4

(51) Int. Cl.
*B60K 35/00* (2006.01)
*G02B 27/01* (2006.01)
*G06F 3/14* (2006.01)

(52) U.S. Cl.
CPC .......... *B60K 35/00* (2013.01); *G02B 27/0172* (2013.01); *G06F 3/14* (2013.01);
(Continued)

(58) Field of Classification Search
CPC .............. B60K 35/00; B60K 2370/149; B60K 2370/175; B60K 2370/152;
(Continued)

(56) References Cited

U.S. PATENT DOCUMENTS

| | | | |
|---|---|---|---|
| 2015/0325052 A1* | 11/2015 | Kuehne ................. | H04N 5/272 345/633 |
| 2018/0056864 A1* | 3/2018 | Weisswange ......... | B60W 40/08 |
| 2018/0130449 A1* | 5/2018 | Jeon ........................ | G09G 5/38 |

FOREIGN PATENT DOCUMENTS

| CN | 104590167 A | 5/2015 |
|---|---|---|
| CN | 105829994 A | 8/2016 |

(Continued)

OTHER PUBLICATIONS

Translation by WIPO dated Jan. 14, 2021 of International Preliminary Report on Patentability from International Application No. PCT/EP2018/074166, 6 pages.

(Continued)

*Primary Examiner* — Xin Sheng
(74) *Attorney, Agent, or Firm* — Staas & Halsey LLP

(57) ABSTRACT

In displaying content superposed in a visual field of a vehicle occupant by a display device worn on the head of the vehicle occupant, vehicle regions are specified on which content must not be superposed. Alternatively, only content that is redundant with respect to content currently displayed within the vehicle regions may be superposed on the restricted vehicle regions.

18 Claims, 1 Drawing Sheet

(52) U.S. Cl.
CPC .. *B60K 2370/149* (2019.05); *B60K 2370/152* (2019.05); *B60K 2370/175* (2019.05); *B60K 2370/77* (2019.05); *G02B 2027/014* (2013.01); *G02B 2027/0141* (2013.01)

(58) Field of Classification Search
CPC ............ B60K 2370/77; G02B 27/0172; G02B 2027/014; G02B 2027/0141; G06F 3/14
See application file for complete search history.

(56) References Cited

FOREIGN PATENT DOCUMENTS

| | | |
|---|---|---|
| CN | 207164368 U | 3/2018 |
| DE | 10 2013 005 342 A1 | 9/2013 |
| DE | 10 2012 218 837 A1 | 6/2014 |
| DE | 10 2014 006 732 A1 | 11/2015 |
| DE | 10 2014 214 516 A1 | 1/2016 |
| DE | 10 2018 211 261.4 | 7/2018 |
| WO | PCT/EP2018/074166 | 9/2018 |

OTHER PUBLICATIONS

International Search Report dated Nov. 13, 2018 of International Application No. PCT/EP2018/074166, 4 pages.
Office Action dated May 17, 2021 from Chinese Application No. 201880095483.4, 7 pages.

\* cited by examiner

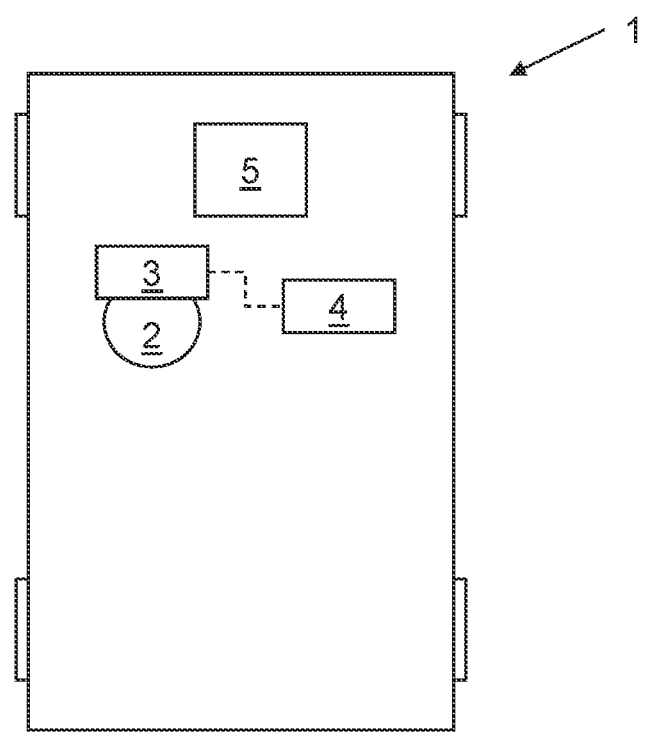

METHOD FOR OPERATING A DISPLAY DEVICE WORN ON THE HEAD BY A VEHICLE OCCUPANT OF A MOTOR VEHICLE, AND DISPLAY SYSTEM FOR A MOTOR VEHICLE

CROSS REFERENCE TO RELATED APPLICATIONS

This application is a U.S. national stage of International Application No. PCT/EP2018/074166, filed on Sep. 7, 2018. The International Application claims the priority benefit of German Application No. 10 2018 211261.4 filed on Jul. 9, 2018. Both the International Application and the German Application are incorporated by reference herein in their entirety.

BACKGROUND

Described below is a method for operating a display device worn on the head by a vehicle occupant of a motor vehicle. Also described is a display system for a motor vehicle for carrying out such a method.

It is known per se to create augmented reality for a vehicle occupant by head-wearable display devices. DE 10 2013 005 342 A1, for example, discloses a motor-vehicle operating apparatus, using smartglasses for representing an augmented reality, wherein virtual projection surfaces on which a superposition is placed by the smartglasses are defined in an interior space of a motor vehicle.

DE 10 2014 006 732 A1 discloses an image overlay of virtual objects in a camera image. Smartglasses serve for representing an augmented reality in an interior space of a vehicle, wherein a representation of an augmented reality is blocked in a region of a real body that is captured.

DE 10 2014 214 516 A1 discloses an apparatus and a method for reproducing data in an augmented reality for an occupant of a vehicle. The apparatus uses smartglasses that serve to create a virtual reality that is represented on a projection surface.

SUMMARY

The method described herein provides a particularly safe representation of an augmented reality in a vehicle.

In the method described herein for operating a display device worn on the head by a vehicle occupant of a motor vehicle, contents are superposed in a visual field of the vehicle occupant by the display device. Vehicle regions on which contents of the display device must not be superposed or on which only contents that are redundant with respect to contents currently displayed within the vehicle regions may be superposed are specified here. The display device is controlled, taking into account the specified vehicle regions, such that the displayed contents are not superposed or only redundant contents are superposed on the vehicle regions.

The head-worn display device may be augmented reality glasses, mixed reality glasses, or an augmented reality contact lens. The display device is thus designed to mix the natural visual perception of the vehicle occupant with an artificial, computer-generated visual perception. A wide variety of contents can thus be superposed into the visual field of the vehicle occupant by the head-worn display device.

In order to ensure particularly safe use of the head-wearable display device in the motor vehicle, provision is made here for specifying the vehicle regions on which contents of the display device must not be superposed or on which only contents that are redundant with respect to contents currently displayed within the vehicle regions may be superposed. If the vehicle occupant is, for example, a driver of the motor vehicle, it is possible in this case to ensure in particular that the occupant is not distracted from or interrupted in their actual driving task by the contents that are displayed by the display device.

No superposition, or only the superposition of correspondingly redundant information, can thus be placed for example by the head-worn display device over essential information, such as speed information in the instrument cluster or provided by a head-up display. The vehicle regions can be, for example, vehicle-side display devices or vehicle-side display surfaces for a wide variety of information. For example, an instrument cluster of the motor vehicle can be such a vehicle region onto which no superposition must be placed by the head-worn display device. Alternatively, it is also possible that the display device in the case of the instrument cluster is controlled such that the display device displays the contents in the field of view of the wearer of the display device such that they are displayed in redundant fashion with respect to the contents displayed by the instrument cluster. The same may also be true for example for a region of a windshield of the motor vehicle onto which a head-up display projects a wide variety of information. For example, it is possible in particular for the driver of the motor vehicle to reliably perceive information that is essential for the driving task, such as maximum permissible speeds, current speeds, and the like, even if the driver is wearing the display device on the head.

Overall, the method ensures that a vehicle occupant wearing the display device can reliably visually perceive important displays in the motor vehicle and also the area surrounding the vehicle, even if they are wearing the display device on the head.

An advantageous embodiment of the method makes provision that a relative arrangement of the display device with respect to the specified vehicle regions is ascertained and taken into account when controlling the display device. When the relative arrangement of the display device is known, it is possible to ensure that contents of the display device are not superposed on the specified regions by the display device. Alternatively, it is possible with particular accuracy, when the relative arrangement of the display device is known, to superpose on the specified vehicle regions contents that are redundant with respect to contents that are currently displayed within the display device.

A further advantageous embodiment of the method makes provision that the visual field of the vehicle occupant wearing the display device is ascertained and taken into account when controlling the display device. For example, a viewing direction of the vehicle occupant can be ascertained to derive therefrom the field of view of the vehicle occupant. The display device can have sensors that are suitable for this, for example cameras that are aimed at the eyes of the vehicle occupant or the like, so as to be able to reliably ascertain the visual field of the vehicle occupant. When the visual field of the vehicle occupant wearing the display device on the head is known, it is possible with particular accuracy to leave out the specified vehicle regions when displaying contents by the display device or to superpose on them only contents that are redundant with respect to contents currently displayed within the specified vehicle regions.

According to a further advantageous embodiment of the method, provision is made that the specified vehicle regions on which contents of the display device must not be superposed or on which only contents that are redundant with respect to contents currently displayed within the vehicle regions may be superposed are transmitted to the display device via a vehicle-side data interface. The data may be transmitted wirelessly between the vehicle-side data interface and the display device. The vehicle-side data interface can be coupled for example to a vehicle bus, via which a wide variety of information relating to the motor vehicle can be provided, for example where exactly specific displays or other display devices or projection surfaces for a head-up display or the like of the motor vehicle are located. It is equally possible to provide information via the vehicle-side data interface as to at which positions various windows, rear-view mirrors, exterior mirrors, and the like of the motor vehicle are located. It is also possible to provide data via the vehicle-side data interface about which display device of the motor vehicle is currently used to display what information or contents. It is thus possible using the vehicle-side data interface to reliably define for the head-worn display device the specified vehicle regions on which contents of the display device must not be superposed or on which only contents that are redundant with respect to contents currently displayed within the vehicle regions may be superposed. The communication between the vehicle-side data interface and the head-worn display device may be permanent and may not be deactivated. It is thus possible to ensure that the information relating to the specified vehicle regions is taken into account permanently when controlling the display device and when displaying corresponding contents.

A further advantageous embodiment of the method makes provision that, as long as there is no data link between the vehicle-side data interface and the display device, the superposition of contents by the display device is prevented. It is possible to ensure in this way that the display device may superpose only contents if the former is provided with data by the vehicle-side data interface that define the specified vehicle regions onto which contents of the display device may not be superposed. It is additionally possible to ensure that the display device is provided with data about which contents are currently being displayed on the vehicle-side so that the display device may, if required, superpose in a redundant manner the contents that are displayed on the vehicle-side so that no information intended for the vehicle occupant wearing the display device is lost. As long as there is no data link between the vehicle-side data interface and the display device, the display device cannot superpose any contents. A disabling feature that prevents contents from being superposed may be integrated into the display device. Only if a functional data link is established does the disabling feature enable the superposition of contents. If the data link is disconnected, the disabling feature becomes active. It is possible in this way to ensure that the display device does not place superposition on vehicle regions that in particular contain information essential for a driver or are relevant for observing traffic on the road. The safety for driving the vehicle can in this way be significantly increased.

In a further advantageous refinement of the method, provision is made that the specified vehicle regions on which no contents of the display device must be superposed are transmitted to the display device via a data interface of an app situated outside the vehicle. For example, if the information transfer or data transfer relating to the specified vehicle regions cannot take place via the vehicle-side data interface and the head-wearable display device, it is possible for at least information about the specified vehicle regions on which contents of the display device must not be superposed to be transmitted to the display device via the data interface of the app situated outside the vehicle. This app situated outside the vehicle can be operated, for example, directly on the display device. It may for example be conceivable that the corresponding vehicle regions are specified specific to the vehicle by the app. For example, the display device can automatically establish, for example in the case of appropriate coupling to the motor vehicle in question, for example via a Bluetooth link or the like, in what type of motor vehicle the display device is being operated, as a result of which the app, which is situated outside the vehicle and may be installed, for example, on the display device itself, automatically specifies the vehicle regions on which contents of the display device must not be superposed. It is likewise conceivable that the app situated outside the vehicle is installed for example on a smartphone, which then transmits the data, relating to the specified vehicle regions on which contents of the display device must not be superposed, wirelessly to the display device. Smartphones can typically be coupled to an infotainment system of a motor vehicle for example via Bluetooth or WLAN. In this context, it would be conceivable that the app installed on the smartphone establishes, after the connection to the infotainment system has been made, what type of motor vehicle this is so as to specify, on this basis, the corresponding vehicle regions on which contents of the display device must not be superposed, and transmits data relating thereto to the display device.

A further advantageous embodiment of the method makes provision that, if the vehicle occupant wearing the display device is a driver of the motor vehicle, any superposition of contents by the display device that do not support a driving task is prevented with respect to the drivers visual field in the region of windows of the motor vehicle. It is thus possible, for example, that the display device is permitted to superpose navigation information, information relating to permissible maximum speeds, and the like for example in the region of a windshield, whereas the display device is prevented from superposing any information that is unrelated to the driving task in the visual field of the driver in the region of windows of the motor vehicle. It is thus possible to ensure that the driver is not distracted from the actual driving task and the perception of the area surrounding the vehicle.

According to a further advantageous embodiment of the method, provision is made that the vehicle regions on which contents of the display device must not be superposed or on which only contents that are redundant with respect to contents currently displayed within the vehicle regions may be superposed are specified differently if the motor vehicle drives autonomously or is driven manually. In particular if the person wearing the display device is the driver of the motor vehicle, it may make sense to differentiate whether the motor vehicle is currently driving autonomously or is driven manually by the driver. In the former case, it is conceivable that the display device may for example even superpose entertaining contents precisely at a location in the visual field of the driver where for example an instrument cluster of the motor vehicle is located. However, if the driver is currently driving the motor vehicle, provision may be made that the display device is controlled such that it does not at least superpose in the region of the instrument cluster information that is unrelated to the driving task. Provision may also be made, for example, that the display device outputs a notification or an alert if autonomous driving operation of the motor vehicle will soon be terminated. In this way, the person wearing the display device can, in particular if the person is the driver of the motor vehicle, be notified early that they must soon take over manual driving operation of the motor vehicle.

In a further advantageous refinement of the method, provision is made that the vehicle regions on which contents of the display device must not be superposed or on which only contents that are redundant with respect to contents currently displayed within the vehicle regions may be superposed are specified differently if the vehicle occupant wearing the display device is a driver or a passenger of the motor vehicle. For example, it is possible to establish by a vehicle-side camera whether the vehicle occupant wearing the display device on the head is seated on a drivers seat or on a front passenger seat or on a back seat of the motor vehicle so as to reliably establish whether the person wearing the display device is the driver or merely a passenger. In the case of the driver, it is important to ensure that the head-worn display device is controlled only such that it does not disturb the driver when performing the driving task and supports the driver in the best possible way. In the case of a passenger, by contrast, it is certainly possible for the display device to superpose information or contents, in particular also those having entertaining character, even as a result if they for example obscure a view out of the windshield of the motor vehicle or for example onto an instrument cluster of the motor vehicle, or the like. By distinguishing whether the person wearing the display device is the driver or merely a passenger, the display device can always be controlled as optimally as possible.

The display device for a motor vehicle described herein uses a head-wearable display device and a data interface for carrying out the method described herein or an advantageous embodiment of the method. Advantageous refinements of the method are considered to be advantageous refinements of the display system and vice versa, wherein the display system in particular performs the method.

An advantageous embodiment of the display system makes provision that the display device is augmented reality glasses, mixed reality glasses or an augmented reality contact lens. It is thus possible for the display device to display in the visual field of the vehicle occupant a variety of contents that can be superposed on, and thus enrich, the visually perceivable reality.

Further advantages, features and details of the invention become apparent from the following description of exemplary embodiments and with reference to the drawing. The features and combinations of features mentioned above in the description and the features and combinations of features shown alone in the description of the figures below and/or in the FIGURE can be used not only in the respectively specified combination but also in other combinations or on their own without departing from the scope of the invention.

BRIEF DESCRIPTION OF THE DRAWINGS

The drawing shows, in the only FIGURE, a schematic illustration of a motor vehicle in which a vehicle occupant wearing augmented reality glasses by which a variety of information can be superposed in the visual field of the vehicle occupant is sitting.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

A motor vehicle 1 is shown in the only FIGURE in a highly schematic illustration. A vehicle occupant 2 wearing augmented reality glasses 3 is sitting in the motor vehicle 1. The augmented reality glasses 3 are connected to a vehicle-side data interface 4. It is possible for the augmented reality glasses 3 to superpose for the vehicle occupant 2 into their visual field a variety of information, for example to support a driving task or simply to entertain the vehicle occupant 2.

For example, it is possible for the augmented reality glasses 3 to superpose in the visual field of the vehicle occupant 2 navigation details, information relating to the current speed of the motor vehicle 1, to the currently permissible maximum speed, and the like. It is furthermore also possible to superpose by the augmented reality glasses 3—in particular if requested by the vehicle occupant 2—information in the area surrounding the vehicle, for example information relating to tourist attractions, restaurants or other points of interest. When operating the augmented reality glasses 3 it is important that the vehicle occupant 2, in particular if the vehicle occupant is a driver of the motor vehicle 1, is not disturbed when performing their driving task or distracted therefrom.

Provision is therefore made, when operating the augmented reality glasses 3, to specify vehicle regions 5 on which contents of the augmented reality glasses 3 must not be superposed or on which only contents that are redundant with respect to contents currently displayed within the vehicle regions 5 may be superposed. The augmented reality glasses 3 are controlled, taking into account the specified vehicle regions, such that the displayed contents are not superposed or only redundant contents are superposed on the vehicle regions 5.

The vehicle regions 5 can be, for example, a variety of displays of the motor vehicle 1, an instrument cluster of the motor vehicle 1, a projection region of a head-up display, internal mirrors, rear-view mirrors, windows of the motor vehicle, and the like.

It is in particular also possible via the vehicle-side interface 4 to provide information about what type of contents are currently being reproduced with what type of display devices of the motor vehicle 1. For example, if a head-up display is used to superpose at that moment the current speed of the motor vehicle 1, the augmented reality glasses 3 can be controlled such that they display the information exactly at the same location where the head-up display displays the same information if the vehicle occupant 2 rotates their head such that they are looking at the display region or the projection surface of the head-up display. The same can also be true for an instrument cluster of the motor vehicle 1. Alternatively, it is also possible for the augmented reality glasses 3 to be controlled such that regions of the instrument cluster or the entire instrument cluster or, for example, a projection surface of a head-up display are always left out such that contents displayed by the augmented reality glasses 3 are not superposed on the specified vehicle regions 5.

Both a relative arrangement of the augmented reality glasses 3 with respect to the specified vehicle regions 5 and the visual field of the vehicle occupant 2 can be ascertained and taken into account when controlling the augmented reality glasses 3. It is thus possible to reliably ensure that either no contents of the augmented reality glasses 3 or only contents that are redundant with respect to contents displayed within the specified vehicle regions 5 are superposed on the specified vehicle regions 5.

If the vehicle-side data interface 4 should fail or not be present at all, it is also possible that the specified vehicle regions on which contents of the augmented reality glasses 3 must not be superposed are transmitted via a data interface of an app situated outside the vehicle to the augmented reality glasses 3.

An app can be installed for example on the augmented reality glasses 3 themselves or for example on a smartphone the vehicle occupant 2 carries along. It is thus possible for example to establish, owing to communication between the app and the motor vehicle 1, what type of motor vehicle or what variant of motor vehicle is involved. When this information is known, the app can in turn generate data that characterize the specified vehicle regions on which contents of the augmented reality glasses 3 must not be superposed. If the vehicle-side data interface 4 should therefore not function or simply not be present in the motor vehicle 1 in question, the app situated outside the vehicle at least makes it possible to define the specified vehicle regions 5 on which contents of the augmented reality glasses 3 must not be superposed.

If the vehicle occupant 2 is a driver of the motor vehicle 1, provision may be made that, with respect to the drivers visual field in the region of windows of the motor vehicle 1, any superposition of contents that do not support any driving task by the augmented reality glasses 3 is prevented. The same may for example also be true for side mirrors or rear-view mirrors of the motor vehicle 1. Provision may also be made that in this case the entire instrument cluster of the motor vehicle 1 is excluded, meaning that no contents that would be superposed on the instrument cluster for the visual field of the driver can be displayed by the augmented reality glasses 3, at least unless the contents represent redundant information that is currently being displayed by the instrument cluster.

In addition it is possible to make a distinction as to whether the motor vehicle 1 is driving autonomously or is being driven manually. If the vehicle occupant 2 is the driver of the motor vehicle 1, it is conceivable for the autonomous driving operation that there are no vehicle regions 5 or significantly fewer vehicle regions 5 provided by the augmented reality glasses 3 in which the augmented reality glasses 3 must not display any contents. However, as soon as the motor vehicle 1 is driven manually, provision may be made for example for all the vehicle regions 5 that are relevant for driving the motor vehicle 1 to be blocked against the superposition of contents by the augmented reality glasses 3. In very general terms, a distinction may also made as to whether the vehicle occupant 2 is a driver or a passenger, wherein, in dependence thereon, the vehicle regions 5 are then specified and the augmented reality glasses 3 are correspondingly controlled.

Even though the text above refers only to the augmented reality glasses 3, the procedures described can likewise be applied to mixed reality glasses or even to augmented reality contact lenses.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for operating a display device worn on a head of a vehicle occupant of a motor vehicle, comprising:
    displaying content superposed in a visual field of the vehicle occupant by the display device;
    identifying specified vehicle regions, on which the content displayed by the display device must not be superposed, differently for a driver and a passenger as the vehicle occupant; and
    controlling the display device, taking into account the specified vehicle regions, whereby the content is not superposed on the specified vehicle regions, differently for the driver and the passenger.

2. The method according to claim 1,
    further comprising ascertaining a relative arrangement of the display device with respect to the specified vehicle regions, and
    wherein the controlling takes into account the relative arrangement of the display device with respect to the specified vehicle regions.

3. The method according to claim 2,
    further comprising ascertaining the visual field of the vehicle occupant wearing the display device, and
    wherein the controlling takes into account the visual field of the vehicle occupant.

4. The method according to claim 3, further comprising transmitting the specified vehicle regions to the display device via a vehicle-side data interface.

5. The method according to claim 4, further comprising preventing, as long as there is no data link between the vehicle-side data interface and the display device, superposition of contents by the display device.

6. The method according to claim 3, further comprising transmitting the specified vehicle regions, via a data interface of an app situated outside the vehicle, to the display device.

7. The method according to claim 6, wherein, when the vehicle occupant wearing the display device is the driver of the motor vehicle, any superposition of content by the display device that does not support a driving task is prevented with respect to the visual field of the driver out of windows of the motor vehicle.

8. The method according to claim 7, wherein the identifying of the specified vehicle regions is different when the motor vehicle is driven autonomously and when the motor vehicle is driven manually.

9. The method according to claim 1,
    further comprising ascertaining the visual field of the vehicle occupant wearing the display device, and
    wherein the controlling takes into account the visual field of the vehicle occupant.

10. The method according to claim 1, further comprising transmitting the specified vehicle regions to the display device via a vehicle-side data interface.

11. The method according to claim 10, further comprising preventing, as long as there is no data link between the vehicle-side data interface and the display device, superposition of contents by the display device.

12. The method according to claim 1, further comprising transmitting the specified vehicle regions, via a data interface of an app situated outside the vehicle, to the display device.

13. The method according to claim 1, wherein, when the vehicle occupant wearing the display device is the driver of the motor vehicle, any superposition of content by the display device that does not support a driving task is prevented with respect to the visual field of the driver out of windows of the motor vehicle.

14. The method according to claim 1, wherein the identifying of the specified vehicle regions is different when the motor vehicle is driven autonomously and when the motor vehicle is driven manually.

15. A display system for a motor vehicle, comprising:
- a head-wearable display device including a controller configured to display content superposed in a visual field of a vehicle occupant, excluding specified vehicle regions on which the content must not be superposed, differently for a driver and a passenger as the vehicle occupant; and
- a data interface providing the head-wearable display device with information identifying the specified vehicle regions.

16. The display system according to claim 15, wherein the head-wearable display device is one of augmented reality glasses, mixed reality glasses and an augmented reality contact lens.

17. The display system according to claim 15, wherein the motor vehicle includes a vehicle-side data interface,
- wherein the data interface of the display system receives the information identifying the specified vehicle regions from the vehicle-side data interface, and
- wherein the controller prevents superposition of the content by the display system when the data interface of the display system is not in communication with the vehicle-side data interface.

18. The display system according to claim 15, wherein the motor vehicle includes windows, and
- wherein the controller prevents superposition of the content over the windows when the driver is wearing the head-wearable display device.

* * * * *